United States Patent [19]

Fernandez et al.

[11] Patent Number: 5,540,750
[45] Date of Patent: Jul. 30, 1996

[54] FRICTION MATERIAL FOR LUBIRCATED TRIBOLOGICAL SYSTEMS

[75] Inventors: Antonio R. Fernandez, Vilassar de Mar, Spain; Pascal Belair, Le Bois Gilet; Seyed H. R. Ghaem Magham Farahni, Antony, both of France

[73] Assignee: Sintermetal, S.A., Ripollet, Spain

[21] Appl. No.: 199,125

[22] PCT Filed: Jun. 22, 1993

[86] PCT No.: PCT/ES93/00052

§ 371 Date: May 19, 1994

§ 102(e) Date: May 19, 1994

[87] PCT Pub. No.: WO94/00609

PCT Pub. Date: Jan. 6, 1994

[30] Foreign Application Priority Data

Jun. 22, 1992 [FR] France .................... 92 07564

[51] Int. Cl.$^6$ ........................................ C22C 29/12
[52] U.S. Cl. .................... 75/235; 75/239; 75/240; 75/244; 75/246; 75/247
[58] Field of Search ................ 75/235, 239, 240, 75/244, 246, 247

[56] References Cited

U.S. PATENT DOCUMENTS 3,941,903  3/1976  Tucker, Jr. ................... 427/190
4,618,049  10/1986  Pjlaima et al. ............. 192/107 M
5,114,468  5/1992  Akutsu et al. ............... 75/234
5,326,384  7/1994  Asada et al. ................ 75/231

FOREIGN PATENT DOCUMENTS 0407596  1/1991  European Pat. Off. .
2207193  6/1974  France .
2354826  5/1975  Germany .
3808460  9/1988  Germany .
0823675  11/1959  United Kingdom .

*Primary Examiner*—Ngoclan Mai
*Attorney, Agent, or Firm*—Michael J. Striker

[57] ABSTRACT

A friction material for a lubricated tribological system, particularly for a synchro of a gear box, consists of a bronze or steel matrix containing from 5 to 40% by weight of embedded hard particles. A 90% portion of the embedded hard particles have a particle size of from 50 and 300 micrometers. These hard particles consist of an alloy including Cr, Mo, W, V, Ni, Zr, Al and/or Ti and carbides of Cr, Mo, W and V; nitrides of Al and Mo; and/or oxides of Cr, Ni, Zr and Ti. The hardness of the hard particles is advantageously above 600 HV 0.1. This friction material has a comparatively high friction coefficient which is constant independent of variations of sliding speed.

9 Claims, No Drawings

FRICTION MATERIAL FOR LUBIRCATED TRIBOLOGICAL SYSTEMS

BACKGROUND OF THE INVENTION

This invention concerns friction materials for lubricated tribological systems and particularly but not exclusively, for the manufacturing of synchro rings used in manual gear boxes.

The materials for gear boxes are subjected to several requirements, some of them contradictory. On the one hand, it is required to have an efficient lubrication at the gears, that is, a friction coefficient as low as possible between contact surfaces. On the other hand, at the synchros a friction coefficient as high as possible is required as well as a friction coefficient which is constant, independant particularly from temperature, sliding speed and contact pressure.

In synchros it is preferable to avoid oil films or to break them by creating geometrical irregularities by machined grooves, or fine irregularities by using a non-homogeneous material. However, these friction materials have produced variable results according to the functional conditions.

SUMMARY OF THE INVENTION

It is an object of the present invention to provide a friction material of the above-described type, particularly for synchros, which overcomes the disadvantages of the prior art friction material described above and which can be used to obtain parts of comparatively complex geometry at comparatively low cost.

It is also an object of the present invention to provide a friction material for synchro rings used in manual gear boxes having a high friction coefficient which is constant independent of variations in temperature, sliding speed and contact pressure.

To achieve these purposes, the invention supplies a friction material for lubricated tribological systems consisting of metal matrix with embedded particles of high hardness. The hard particles are of size between 50 and 300 micrometers.

Preferably, the material of the hard particles is chosen between those having a hardness higher than 600 HV 0.1 (Vickers Hardness).

Another difficulty arises from the fact that in modern gearboxes, high pressure lubricants contain certain additives of the type of borates or sulphates, which are intended to reduce the friction between the gears, and to react on the material of the synchro. Preferably, the material of the particles is chosen among those that keep their hardness and have a "passive" surface by reaction in the lubricated tribological system.

As "passive" surface, a surface is understood that originates, when immersed in the environment considered, a continuous reaction layer which constitutes a barrier between the material and the environment.

When the described material is intended to be used in presence of a lubricant with an extreme pressure additive containing boron or sulphur, it is advantageous to choose the material of the particles among the carbides of Cr, Mo, W or V, the nitrides of Al or Mo, and the oxides of Cr, Ni, Zr or Ti, as well as the alloys rich in these elements.

According to a simple version, the matrix is of bronze.

According to another version, it is of steel.

To obtain the material according to the invention, it is advantageous that it is obtained by a mixture of powders having the composition of the matrix and the particles.

Preferably the hard particles constitute 5 to 40% in weight of the total material. For a lower percentage, the desired effect is obtained in an insufficient degree. For a higher percentage than that already stated, the manufacturing of material by sintering or other means, becomes difficult.

Tables I and II show the results of 23 assays and allow a comparision of the performance of examples according to the invention with different reference examples. These assays consisted in testing cylindrical examples of 3 mm diameter on a tribometer. The tribometer is of the pin and disc type and it is equipped in order to ensure the lubrication of the contact, allowing at the same time adjustment of temperature, contact pressure and rotational speed.

Friction coefficients shown in Table II are obtained from the friction forces measured in the tribometer. Sliding speeds have been varied from 0.34 m/s which corresponds according to the current technology to the boundary lubrication (friction coefficient >0.1) or mixed (friction coefficient between 0.1 and 0.03), to 1.7 m/s which corresponds according to the current technology to the hydrodynamical lubrication regimes (friction coefficient <0.03).

Assays number 1 to 3 have been carried out with specimens made with silicium rich brass bars. This composition is generally used for the manufacturing of synchro rings used in manual gear boxes. In assay 3 the specimens were machined with grooves of 0.5 mm height and a width of 0.2 mm at the top and at the bottom of the valleys. The specimens of assay 4 were obtained by high temperature spraying of molybdenum on a brass substrate.

Specimens in assays 5 and 7 consisted in a bronze matrix with graphite and iron particles. This metallurgy is used in common sintered friction materials.

Specimens in assays 8 and 12 have been manufactured to test the friction properties of a ductile matrix including some added molybdenum. Specimens of assays 9 and 23 have been manufactured to test the friction properties of the matrix without additives.

Specimens of assays 10, 11, 19 and 21 have inclusions rich in chromium, but a hardness below the range required in this invention. These specimens are a reference for assay 18.

Specimens of assays 13, 14, 16 and 18 correspond to the invention with 5, 15 and 20 percent by weight inclusions. They have been manufactured according to classical processes of powder metallurgy (compaction and sintering of a powder mixture).

Specimens of assay 15 are identical to assay 14, except that they have machined grooves of 0.3 mm height and a width of 0.2 mm at the top and at the bottom of the valleys.

Specimens of assay 20 correspond also to the invention but they have inclusions of different alloys and hence, different hardness. Specimens of assay 22 have the same composition as in assay 18 but with particles of smaller size below the range required in the invention.

It has been observed, especially in assay 14, when looking at the frictional surface, that the inclusions are not affected by the lubricating oil, in contrast to the bronze matrix that shows strong color changes. Comparison between assay 14 and 15 shows that the presence of grooves adds a small improvement but they can be suppressed without major inconvenience.

TABLE I

| Assay | Matrix | Inclussions % - size - hardness - composition | grooves |
|---|---|---|---|
| 1 (reference) | brass | no | no |
| 2 (reference) | brass | no | no |
| 3 (reference) | brass | no | yes |
| 4 (reference) | 100% Mo | no | no |
| 5 (reference) | bronze | 2% Fe + 2% graphite | no |
| 6 (reference) | bronze | 2% Fe + 2% graphite | no |
| 7 (reference) | bronze | 5% Fe + 2% graphite | no |
| 8 (reference) | bronze | 15% molybdenum | no |
| 9 (reference) | bronze | no | no |
| 10 (reference) | bronze | 20% - <100 μm - 200 HV0.5 - (A) | no |
| 11 (reference) | bronze | 20% - <100 μm - 200 HV0.5 - (A) | no |
| 12 (reference) | bronze | 15% molybdenum | no |
| 13 (invention) | bronze | 5% - <110 μm - 950 HV0.5 - (B) | no |
| 14 (invention) | bronze | 15% - <110 μm - 950 HV0.5 - (B) | no |
| 15 (invention) | bronze | 15% - <110 μm - 950 HV0.5 - (B) | yes |
| 16 (invention) | bronze | 15% - <110 μm - 950 HV0.5 - (B) | no |
| 17 (invention) | bronze | 15% - <110 μm - 950 HV0.5 - (B) | no |
| 18 (invention) | bronze | 20% - <110 μm - 950 HV0.5 - (B) | no |
| 19 (reference) | bronze | 20% - <100 μm - 200 HV0.5 - (C) | no |
| 20 (invention) | bronze | 20% - <150 μm - 800 HV0.5 - (D) | no |
| 21 (reference) | bronze | 20% - <100 μm - 200 HV0.5 - (A) | no |
| 22 (reference) | bronze | 15% - <50 μm - 950 HV0.5 - (B) | no |
| 23 (reference) | bronze | no | yes |

(A): 19% Cr, 11% Ni, rest Fe
(B): 30% Cr, 4% CNi, 1% Mn, 2,2% Ni, 3% Mo, rest Fe
(C): 5% Cr, 1% si, 1,1% Mo, rest Fe
(D): 5% Cr, 30% Mo, 2,5% Si, rest Fe
brass: 0,75 Ni, 1,75% Al, 3% Mn, 62% Cu, rest Zn
bronze: 90% Cu, 10% Sn

TABLE II

| Assay | Temperature °C. | Pressure Mpa | Sliding speed 0,34 m/s | Sliding speed 1, 7 m/s |
|---|---|---|---|---|
| 1 | 20 | 80 | 0,080 | 0,015 |
| 2 | 80 | 90 | 0,125 | 0,015 |
| 3 | 20 | 80 | 0,125 | 0,115 |
| 4 | 10 | 80 | 0,115 | 0,100 |
| 5 | 20 | 56 | 0,065 | 0,035 |
| 6 | 20 | 90 | 0,070 | 0,030 |
| 7 | 20 | 56 | 0,055 | 0,025 |
| 8 | 20 | 90 | 0,075 | 0,030 |
| 9 | 20 | 11 | 0,080 | 0,015 |
| 10 | 20 | 90 | 0.085 | 0,050 |
| 11 | 80 | 56 | 0,115 | 0,090 |
| 12 | 20 | 56 | 0,075 | 0,030 |
| 13 (+) | 20 | 56 | 0,085 | 0,070 |
| 14 (+) | 20 | 56 | 0,105 | 0,095 |
| 15 (+) | 20 | 11 | 0,115 | 0,105 |
| 16 (+) | 80 | 56 | 0,100 | 0,087 |
| 17 (+) | 120 | 56 | 0,112 | 0,096 |
| 18 (+) | 20 | 56 | 0,125 | 0,106 |
| 19 | 20 | 56 | 0,070 | 0,040 |
| 20 (+) | 20 | 56 | 0,120 | 0,115 |
| 21 | 20 | 56 | 0,010 | 0,025 |
| 22 | 20 | 56 | 0,080 | 0,060 |
| 23 | 20 | 56 | 0,115 | 0,095 |

(+) Assay according to the invention

In the above Tables the ", " is used in place of the "." to indicate the decimal point according to the European method.

While the invention has been illustrated and described as embodied in a friction material for a lubricated tribological system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Friction material for a lubricated tribological system, said friction material consisting of a metal matrix containing from 5 to 40% by weight of hard particles embedded in said metal matrix,
   wherein at least 90% of said hard particles have a particle size between 50 and 300 micrometers; a hardness maintained substantially constant during operation of a lubricated tribological system containing said friction material and a passive surface in the lubricated tribological system.

2. Friction material as defined in claim 1, wherein said hardness of said hard particles is greater than 600 HV 0.1.

3. Friction material as defined in claim 1, wherein said hard particles consist of an alloy including at least one alloy metal selected from the group consisting of Cr, Mo, W, V, Ni, Zr, Al and Ti and at least one member selected from the group consisting of carbides of Cr, Mo, W and V; nitrides of Al and Mo; and oxides of Cr, Ni, Zr and Ti so that said friction material can be used in the presence of a high pressure lubricant containing a high pressure additive selected from the group consisting of borates and sulfates.

4. Friction material as defined in claim 1, wherein said metal matrix consists of bronze.

5. Friction material as defined in claim 1, wherein said metal matrix consists of steel.

6. Friction material as defined in claim 1, consisting of a sintered mixture of powders, one of said powders having a chemical composition equal to that of said metal matrix and another of said powders having another chemical composition equal to that of said embedded hard particles.

7. Friction material for a lubricated tribological system, said friction material consisting of a metal matrix selected from the group consisting of bronze and steel and from 5 to 40% by weight of hard particles embedded in said metal matrix, said hard particles having a hardness greater than 600 HV 0.1, wherein at least 90% of said hard particles have a particle size of from 50 and 300 micrometers and said hard particles consist of an alloy including at least one alloy metal selected from the group consisting of Cr, Mo, W, V, Ni, Zr, Al and Ti and at least one member selected from the group consisting of carbides of Cr, Mo, W and V; nitrides of Al and Mo; and oxides of Cr, Ni, Zr and Ti.

8. Friction material as defined in claim 1, wherein said particle size is less than 110 microns and said hardness is at least 950 HV 0.5.

9. Friction material as defined in claim 7, wherein said particle size is less than 110 microns and said hardness is at least 950 HV 0.5.

* * * * *